United States Patent [19]
Kaffenberger

[11] 3,942,141
[45] Mar. 2, 1976

[54] FLANGE

[75] Inventor: Ernst Kaffenberger, Backnang, Germany

[73] Assignee: Licentia Patent-Verwaltungs-G.m.b.H., Frankfurt am Main, Germany

[22] Filed: May 25, 1973

[21] Appl. No.: 363,853

[30] Foreign Application Priority Data
May 26, 1972 Germany............................ 2225556
June 24, 1972 Germany............................ 2231024
June 28, 1972 Germany............................ 2231623

[52] U.S. Cl............... 333/98 R; 285/349; 285/352; 285/368; 285/414
[51] Int. Cl.² ......................................... H01P 1/22
[58] Field of Search .......... 285/368, 412, 364, 365, 285/366, 367, 406–412, 414, 415, 67, 325, 349, 35 L; 333/98 R

[56] References Cited
UNITED STATES PATENTS

| | | |
|---|---|---|
| 1,179,091 | 4/1916 | Gray et al. ...................... 285/368 X |
| 1,525,647 | 2/1925 | Haughey ......................... 285/368 X |
| 2,284,530 | 5/1942 | Meyer ............................. 285/368 X |
| 2,402,868 | 6/1946 | Boyle .............................. 285/368 X |
| 2,764,431 | 9/1956 | Wilde ................................. 285/368 |
| 2,859,052 | 11/1958 | Corbeels et al. ................. 285/363 X |
| 3,315,186 | 4/1967 | Rosler et al. ...................... 333/98 X |
| 3,587,010 | 6/1971 | Walsh ................................ 333/98 X |
| 3,761,114 | 9/1973 | Blakeley ......................... 285/368 X |
| 3,784,939 | 1/1974 | Maeda et al. ......................... 333/98 |

Primary Examiner—Dave W. Arola
Attorney, Agent, or Firm—Spencer & Kaye

[57] ABSTRACT

A flange adapted to be arranged on a tube. A plurality of flange parts fit together to define a flange having a central opening for surrounding the outer perimeter of a tube. Each of the flange parts defines at least a portion of the central opening. Each flange part is provided on its surface portion which defines at least a portion of the central opening with at least one protrusion for engaging a corresponding groove in an associated tube in a form-fitting relationship.

11 Claims, 13 Drawing Figures

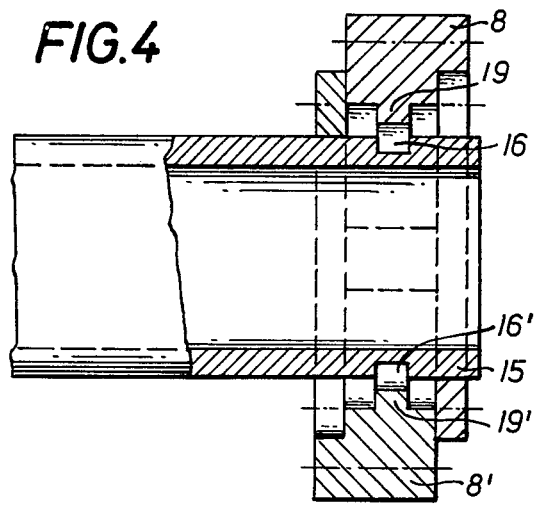
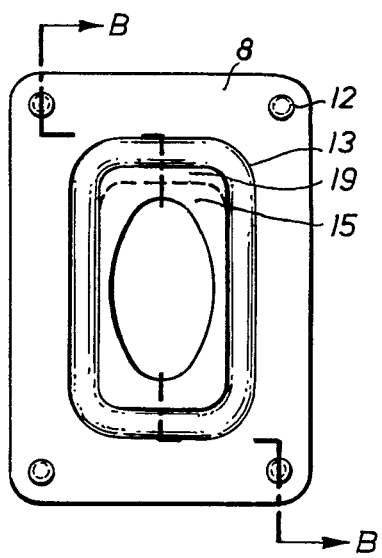
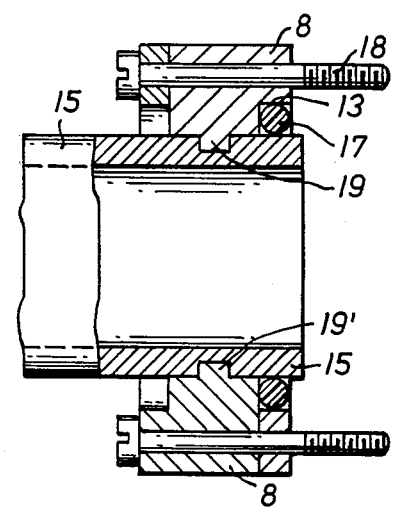

FLANGE

BACKGROUND OF THE INVENTION

The present invention involves a flange having an axial opening which can be pushed onto a pipe into a desired position.

It is known to provide flanges on the ends of pipes, such as for example waveguides, so that the pipes can be easily connected with other sections of pipes or to input or output channels of various instruments.

The use of such a flange with a waveguide having an approximately rectangular outer cross section is disclosed in the German Pat. No. 1,806,361 which provides a push-on waveguide flange which is designed to be initially placed onto the waveguide in an oblique position and is then form-fittingly connected with the waveguide when it is pivoted into the plane of the frontal face of the waveguide. The connection of such a flange with the waveguide is accomplished through the use of corresponding grooves and strips in the respective elements. A drawback of this type of fastening is that the waveguide is only properly centered, which centering is required for electrical reasons, after it has been securely connected to the counterflange which occurs by fully tightening the flange connection bolt. With the original oblique attachment of the waveguide to the corresponding component to which it is to be connected, for example to another waveguide or instrument, the friction which is created along the frontal face of the waveguide may be so strong that it becomes impossible to properly center the waveguide and, consequently, the bottom of the groove in the waveguide becomes deformed by the protruding ledge in the axial opening of the flange. Since it is desirable to have a low reflection factor for the entire waveguide train, this effect becomes a serious drawback. Furthermore, with such an arrangement, the cutting of the grooves into the waveguide at the point of installation is a relatively complicated process since it is necessary to produce oppositely disposed grooves in the waveguide in two different cross-sectional planes.

SUMMARY OF THE INVENTION

An object of the present invention is to provide a flange adapted to be arranged on a tube which overcomes the types of drawbacks mentioned above.

Another object of the present invention is to provide a flange which can be easily installed without any need for complicated tools and which eliminates the need for soldering or welding in order to approach a perfect flange connection.

A further object of the present invention is to provide a waveguide flange which can be easily and accurately arranged on a waveguide.

The flange according to the present invention is based upon an improved structure of the above-described flange. In accordance with the present invention, the flange is constructed of a plurality of flange parts which fit together to define a flange having a central opening for surrounding the outer perimeter of a tube. Each of the flange parts defines at least a portion of the central opening and each part is provided on its surface portion, which helps define the central opening, with at least one protrusion for engaging a corresponding groove in a tube in a form-fitting relationship.

The flange according to the present invention can be constructed to be utilized on either noncircular or circular tubes, which tubes, for example, can be waveguides.

In an embodiment of the flange according to the present invention, there are two flange parts each of which has an axial bore which forms at least a portion of the central opening and the two flange parts are arranged to fit together along a plane which is transverse to the longitudinal axis through the central opening. The flange according to this embodiment, while generally utilized with tubes having noncircular, for example rectangular, cross sections, could also be utilized with tubes having circular cross sections.

In another embodiment of the flange according to the present invention for use on circular tubes, the flange parts are arranged within the same cross-sectional plane and each part forms a portion of the central opening which has a circular cross section. Each of these flange parts are identical in shape. At one end of each of the flange parts, there are symmetrical portions defining a recess which extends within a plane perpendicular to the longitudinal axis through the central opening. A projection is located on each of the flange parts at the opposite end from the recess; this projection symmetrically corresponds to the recess in the adjacent flange part so that adjacent flange parts fit together by interleaving the projection and the recess on adjacent parts.

The various embodiments of the flange according to the present invention are especially applicable for use as waveguide flanges for use on waveguides.

BRIEF DESCRIPTION OF THE DRAWINGS

FIG. 3b is a side elevational sectional view along lines A—A of the flange shown in FIG. 3a.

FIG. 4 is a side elevational sectional view of a flange consisting of two flange parts, one of which is shown in FIGS. 3a and 3b, which flange parts are shown being arranged on a tube.

FIG. 5a shows a front elevational view of the flange shown in FIG. 4 arranged in place on a tube.

FIG. 5b shows a side elevational sectional view along lines B—B of the flange and corresponding tube shown in FIG. 5a.

FIG. 7b is a side elevational view along lines D—D of the flange part shown in FIG. 7a.

FIG. 8b is a side elevational view along lines E—E of the flange and the associated tube shown in FIG. 8a.

DESCRIPTION OF THE PREFERRED EMBODIMENTS

Figure 1:
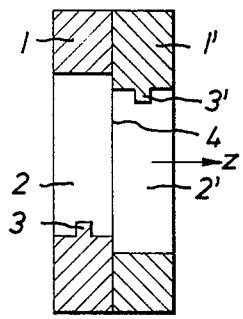
FIG. 1 shows a side elevational sectional view of a first embodiment of a flange according to the present invention, which is to be utilized with a tube having a rectangular cross section.

The flange shown in FIG. 1 is divided into two flange parts 1 and 1', along a plane which is transverse to the longitudinal axis, z, through the central opening of the flange. The two flange parts 1 and 1' fit together along a line 4 which extends parallel to the front face of the flange. In the embodiment illustrated in FIG. 1, the division is made such that both flange parts 1 and 1' have the same width. The passages, or axial bores, 2 or 2' of the two flange parts form the central opening of the flange which corresponds to the outer diameter of the associated tube. The longitudinal axis z, which is indicated by the dot-dash line, through the central opening, also represents the longitudinal axis of the associated tube. Each flange part has at least one protrusion, 3 or 3', which extends into the respective flange passage, 2 or 2'.

It should be noted that each of the passages 2 and 2' is larger than the outer diameter of the associated tube so that the flange parts can be easily pushed onto the tube and then pushed in a direction transverse to the tube such that the protrusion engages the corresponding groove in the tube. The formfitting connection of the flange parts with the associated tube is effected by the use of appropriately shaped corresponding grooves in the tube in which the protrusions 3 and 3' engage. As shown in FIG. 1, the protrusions 3 and 3' are in different planes perpendicular to the longitudinal axis z of the tube.

Figure 2:
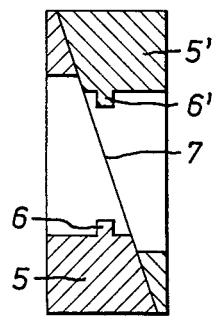
FIG. 2 is a side elevational sectional view of a second embodiment of a flange according to the present invention, which is to be utilized with a tube having a rectangular cross section.

In a second embodiment of the present invention, as shown in FIG. 2, the cross section of the entire flange which forms a rectangle in the plane of the drawing is divided by a diagonally extending parting line 7 into two flange parts 5 and 5'. In this embodiment, the two protrusions 6 and 6' are provided in the same plane.

Figure 3A:
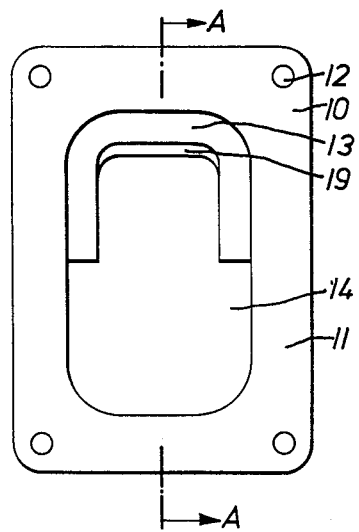
FIG. 3a is a front elevational view of a third embodiment of one flange part of a flange according to the present invention which is to be utilized with a tube having a rectangular cross section.

In a third embodiment of the present invention the two identical flange parts may be so designed that they are reverse images of one another with respect to the cross-sectional plane of the associated tube, such as shown in FIG. 4. One of these flange parts, 8, is shown by itself in FIGS. 3a and 3b for the sake of simplicity. This flange part, 8, was produced in that the above-mentioned rectangular cross section of the entire flange in the plane parallel to the longitudinal axis through the central opening was divided along a parting line 9 which has at least one step in it. This parting line 9 is shown by the heavy solid line in FIG. 3b. The longitudinal axis through the central opening of the flange is again marked z. The passage, 14, corresponding to the outer cross section of the associated tube, provides an opening through which the associated tube can be passed. The flange part 8 is divided by the parting line 9 in such a way that its upper half 10 is relatively wide compared to the lower half 11, which constitutes only a relatively narrow disc. The flange part 8 has a protrusion 19 which extends into the passage 14. Axial bores 12, as shown in FIG. 3a, are arranged in both the upper and lower portions, 10 and 11, respectively. Connecting bolts pass through the axial bores 12 of the adjacent portions of the flange parts which are aligned in order to connect the adjacent flange parts.

Figure 3B:
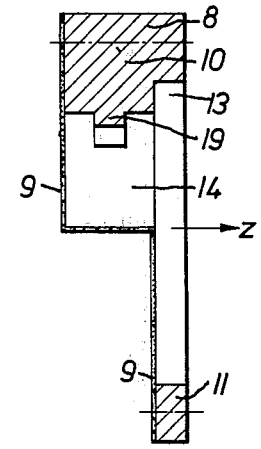

The connection between a flange and a counterflange and between the flange and the associated tube, especially for example a waveguide, must be electrically and/or mechanically tight. For this purpose at least one flange part is provided on its frontal face with a recess 13 for accommodating an appropriate seal, as shown in FIGS. 3a and 3b. Of course, the other flange part can also be provided with a recess so that a gas-tight flange connection can be realized, for example, by the insertion of the appropriate elastic sealing strips. This produces not only a seal between the flange parts and the waveguide, but also produces a seal between the individual waveguide trains so long as the appropriate recess is also provided at the counterflange. The shape of the fastening groove and of the corresponding recess depends in the individual case on whether the flange is to be rotated with respect to the waveguide or not. If a rotatable fastening is to be provided, the groove of a circular waveguide will be coaxial and a circular ring-shaped strip will be attached to the flange parts. By utilizing a groove whose bottom is tangential to the waveguide cross section and corresponding protrusions on the flange parts, it is possible to prevent rotation of the flange with respect to the waveguide. The tensile strength of the connection between the flange and the waveguide can be further increased by providing the cross section of the fastening grooves and protrusions with radial elements at the points of contact. The inner surface of the flange part, i.e. the surface defining the flange passage, in the vicinity of the flange protrusions also serves to increase the strength of the connection between the flange and the associated waveguide.

Since waveguide connections must also be electrically tight, it is possible to provide for this purpose appropriately dimensioned recesses in a known manner at the frontal faces of the flanges which are to be connected, which recesses act as socalled wave traps.

FIG. 4 shows a flange which has been pushed over an associated waveguide 15. The flange includes two reverse image flange parts 8 and 8' corresponding to those of FIG. 3. The waveguide is provided with grooves 16 and 16' into which the protrusions 19 and 19', respectively, of the flange parts engage. These two flange parts, which form the flange, are pushed together so that their bores 12 are aligned in order to accommodate the connecting bolts and the total arrangement is centered and formfittingly locked together when the connecting bolts are connected in place.

The waveguide flange shown in FIG. 4 is shown arranged in place on a waveguide in FIGS. 5a and 5b, with the two flange parts 8 and 8' being connected together by the connecting bolts 18. A sealing bead 17 is shown inserted into the recess 13.

Figure 6:
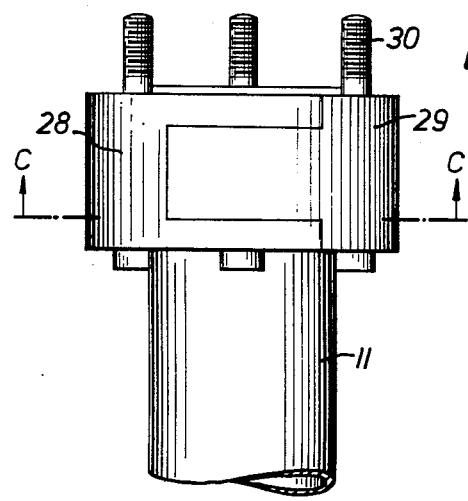
FIG. 6 shows a top view of a fourth embodiment of a flange according to the present invention, which is to be utilized on a tube having a circular cross section.
Figure 8A:
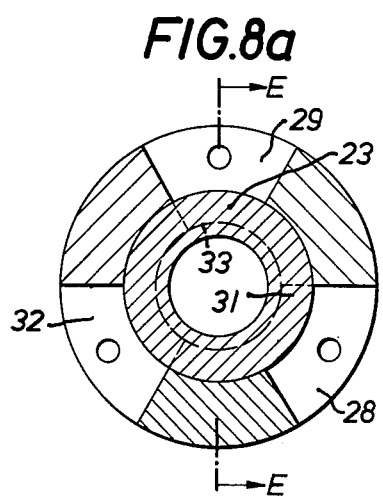
FIG. 8a is a cross-sectional view along lines C—C of the flange and the associated tube shown in FIG. 6.
Figure 8B:
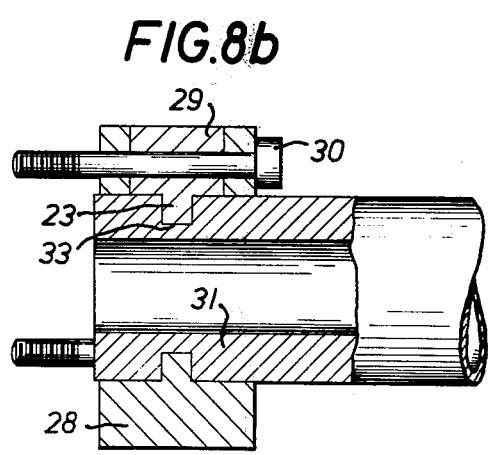

A further embodiment of the flange according to the present invention for use with a circular tube, or waveguide as shown, for example, a circular waveguide 31 is shown in FIG. 6. Two flange parts 28 and 29, which are shown in FIG. 6 together with a further flange part 32, as shown in FIG. 8a, form the entire flange. The flange parts are interconnected in the form of a joint and each of the parts has its inside surface defining a portion of the central opening of the flange. Each of the flange parts has on its surface facing the waveguide 31 at least one protrusion 23 which engages in a corresponding groove in the waveguide, as this is shown in FIG. 8b. The flange parts are held together by fastening bolts 30 which connect adjacent portions of the flange parts.

Figure 7A:
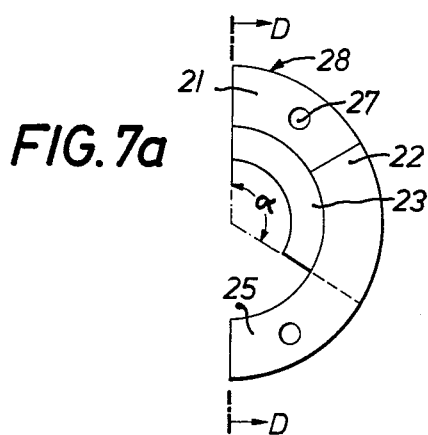
FIG. 7a is a front elevational view of one flange part of the flange shown in FIG. 6.
Figure 7B:
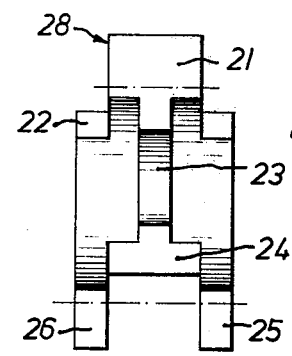

One of the flange parts, 28, of the flange shown in FIG. 6 is shown in FIGS. 7a and 7b. This flange part 28 has a symmetrically arranged projection 21 at one end and a fork-type recess 24 at the other end. Projection 21 and recess 24 are constructed so that the projection of one flange part will correspond with the recess in the adjacent flange part. With the aid of fastening bolts 30 (FIG. 8b) which are placed into bores 27, the flange parts can be connected together in the form of a joint since the bores are disposed in the individual parts in such a way that they can be aligned with one another. A protrusion 23 is disposed on the inside surface of the flange part which surface defines a portion of the central opening, so as to engage in an annular groove disposed in parallel with the cross-sectional plane of the associated waveguide so as to produce the desired form-fitting connection. Each of the end portions 22 and 26 of the flange part has a stepped section so that the flange parts can be assembled together to form a flange which has a contiguous constant flange thickness. This stepping configuration can be adapted to the respective technical requirements in various ways.

FIGS. 8a and 8b provide a cross-sectional view and side sectional view of the flange and associated waveguide shown in FIG. 6. As shown in FIG. 8a, the flange includes three flange parts 28, 29 and 32, which are identical to one another. The protrusions 23 of the individual flange parts engage in annular groove 33 of the circular waveguide 31.

The flange does not have to consist of three individual parts, as illustrated, but can include either two parts or more than three and furthermore these flange parts do not have to be completely identical. The number of individual parts substantially depends on the bore configuration of the flange. If a bore configuration is used where four aligned pairs of, or eight total, bores are to be uniformly distributed over the partial circle, then the flange will advisably be constructed of four individual parts. If, however, three aligned pairs of, or six total, bores are provided, as in the illustrated embodiment, the flange advisably consists of three parts.

In the above described embodiment of the flange for a circular tube, it is further possible to provide the flange parts with an appropriate recess for the insertion of an elastic strip in the same manner as previously discussed with respect to the other flange embodiments such as shown in FIG. 5b. This seal is provided so that the flange can be sealed against the circular tube and/or against a further connecting flange. If the circular tube is, for example, a microwave waveguide, the seal will be effected in a known manner based upon consideration of the electrical requirements.

The use of the flange according to the present invention is not limited to tubes having rectangular and circular cross sections but can also be used with other cross sections, for exammple for aluminum waveguides with elliptical inner cross sections.

A waveguide with an approximately elliptical inner cross section for a frequency band of 7.7 MHz–8.5 GHz has the following dimensions:

a large inner diameter 36.8 mm;
a small inner diameter 19.1 mm; and
an outer cross section formed by two parallel lines which are themselves parallel to the large inner diameter and circular sections whose midpoints lie on the waveguide axis and have radii of 22.0 mm.

The "edges" between the aforesaid circular sections and the aforesaid lines are formed by circular sections with radii of 7.0 mm.

It will be understood that the above description of the present invention is susceptible to various modifications, changes and adaptations and the same are intended to be comprehended within the meaning and range of equivalents of the appended claims.

I claim:

1. A flange adapted to be arranged on the end of a tube for connecting the tube to a flange on the end of a further tube, said flange comprising in combination: two identical flange parts which fit together to define a single flange having a central opening whose periphery corresponds to the outer perimeter of a tube, each said flange part having an axial opening at least a portion of the periphery of which corresponds to the outer perimeter of the tube on which the flange is to be arranged, each said axial opening being larger in part than the outer perimeter of the tube on which said flange is to be arranged and through which the tube can pass so that each said flange part will surround the entire outer perimeter of the tube, said two flange parts fitting together in a mating arrangement along a plane transverse to the longitudinal axis of said central opening with said portion of the periphery of said axial opening of each said flange part defining a portion of the periphery of said central opening; at least one protrusion provided on the surface portion of each of said flange parts which defines a portion of said central opening for engaging a corresponding groove in a tube in a form fitting relationship; and means for connecting said flange parts together.

2. A flange as defined in claim 1 wherein said protrusions lie in a plane which is perpendicular to the longitudinal axis of said central opening.

3. A flange as defined in claim 1 wherein said two flange parts are reverse images of one another with respect to the plane along which they are mutually arranged.

4. A flange as defined in claim 3 wherein said flange has a rectangular cross section in a plane parallel to the longitudinal axis through said central opening and said flange parts fit together along the diagonal of the rectangular cross section.

5. A flange as defined in claim 3 wherein said flange has a rectangular cross section in a plane parallel to the longitudinal axis through said central opening and each of said flange parts has at least one step in the plane of the rectangular cross section.

6. A flange as defined in claim 1 wherein at least one flange part has a recess on its frontal face adapted to accommodate a seal therein.

7. A flange as defined in claim 1 wherein said flange is a waveguide flange for a waveguide.

8. A flange as defined in claim 1 wherein said central opening is rectangular so that said flange can surround a tube having a rectangular outer shape.

9. A flange as defined in claim 1 wherein said central opening is elliptical so that said flange can surround a tube having an elliptical outer shape.

10. A flange as defined in claim 1 wherein at least one flange part has a recess on its surface portion which defines at least a portion of said central opening and said recess is adapted to accommodate a seal therein.

11. A flange as defined in claim 1 wherein said connecting means includes at least two bores provided in each of said flange parts, said bores being arranged parallel to the longitudinal axis through said central opening and disposed within said flange parts such that the bores on adjacent portions of said flange parts are aligned; and fastening bolts passing through said aligned bores so as to interconnect said flange parts.

* * * * *